(12) United States Patent
Tateshima et al.

(10) Patent No.: US 6,332,505 B1
(45) Date of Patent: Dec. 25, 2001

(54) RADIATOR STRUCTURE FOR MOTORCYCLE

(75) Inventors: Yoshinobu Tateshima; Yuichi Kato, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/594,795

(22) Filed: Jun. 16, 2000

(30) Foreign Application Priority Data

Jun. 16, 1999 (JP) .................................................. 11-169494

(51) Int. Cl.$^7$ .................................................. B62K 11/00
(52) U.S. Cl. .......................................... 180/229; 180/68.4
(58) Field of Search ................................. 180/68.4, 68.6, 180/219, 229; 165/41, 42

(56) References Cited

U.S. PATENT DOCUMENTS

| | | | |
|---|---|---|---|
| 4,478,306 | * 10/1984 | Tagami | 180/229 |
| 4,537,273 | * 8/1985 | Funabashi | 180/229 |
| 5,176,111 | * 1/1993 | Nakamura et al. | 180/229 |
| 5,715,778 | * 2/1998 | Hasumi et al. | 180/229 |

FOREIGN PATENT DOCUMENTS

B2-2773242   4/1998   (JP) .

* cited by examiner

Primary Examiner—Kevin Hurley
(74) Attorney, Agent, or Firm—Birch, Stewart, Kolasch & Birch, LLP

(57) ABSTRACT

By providing a main flame extending from a head pipe and a radiator below a front part of the main frame in a motorcycle having the radiators arranged to the side of the vehicle, it becomes possible to arrange the radiator close to the main frame by providing an upper indentation in an upper corner of an upper tank towards the center of the vehicle. It also becomes possible to arrange the radiator close to an exhaust pipe by providing a lower indentation in a lower outer corner of the lower tank. An upper tank and a lower tank are the same molded part and can therefore be made with a single mold. Since the upper indented sections are provided, there is no interference between the main frame and the radiator. Since the lower indented sections are provided, there is no interference between the mainframe and an exhaust pipe. Furthermore, it is possible to increase the core surface area (heat radiation characteristics) of the middle of the radiator. Accordingly, there is no need for a plurality of molding processes and it is possible to reduce the manufacturing cost of the radiator.

14 Claims, 5 Drawing Sheets

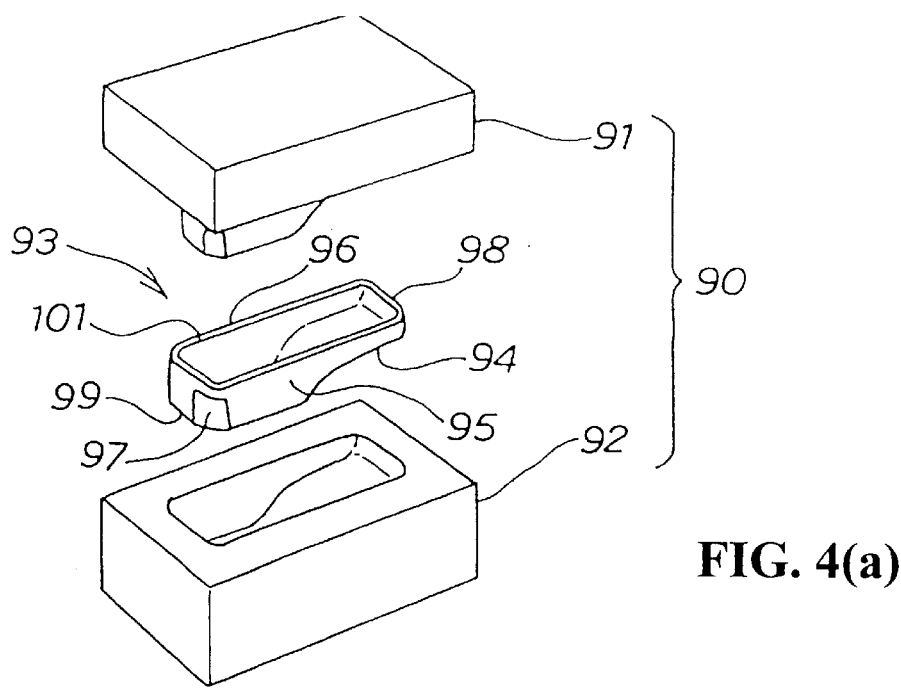
FIG. 4(a)
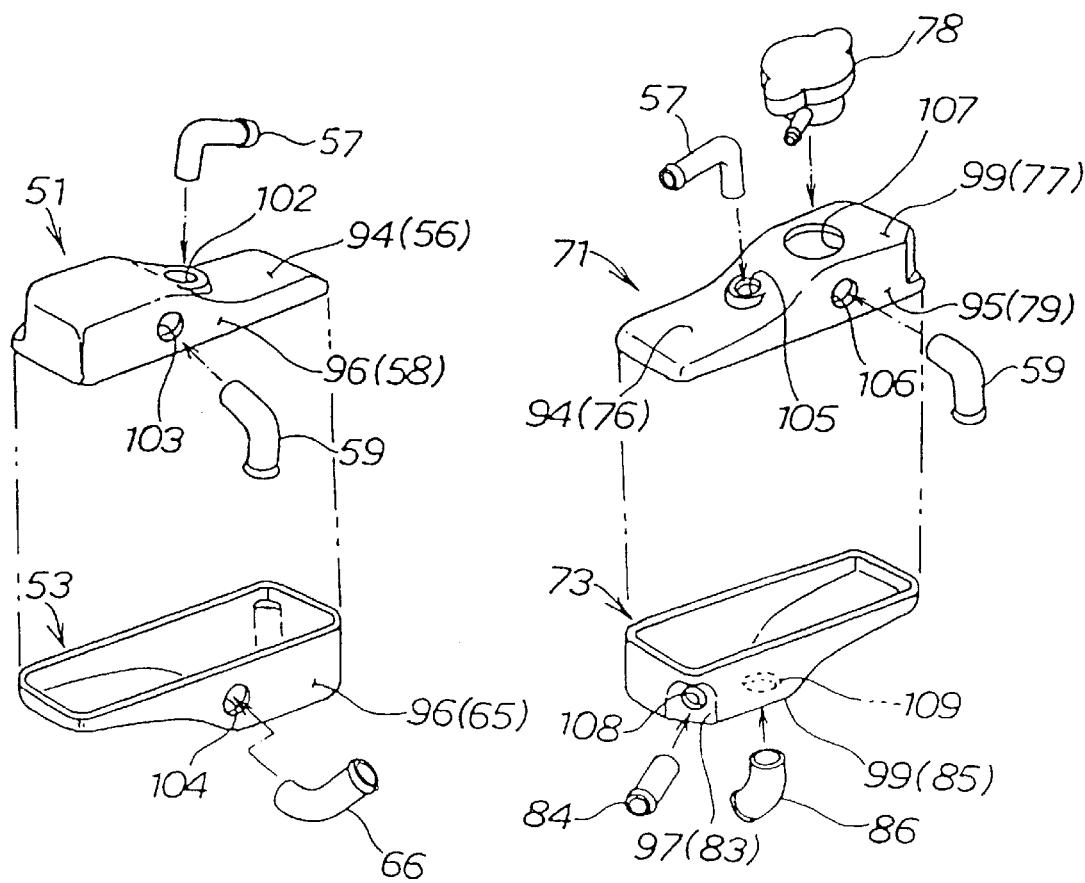
FIG. 4(b)
FIG. 4(c)

RADIATOR STRUCTURE FOR MOTORCYCLE

BACKGROUND OF THE INVENTION

1. Field of the Invention

The present invention relates to an improvement to a radiator structure for a motorcycle.

2. Description of Related Art

A motorcycle radiator is shown, for example, in Japanese Patent No. 2773242 entitled "Motorcycle Radiator." This motorcycle radiator, as shown in FIG. 1 of that publication, includes two radiator units 4 and 5 attached together in parallel with each other. The radiator is attached by being interposed between a tank rail 2 (refer to FIG. 2) and a down tube 3.

Each radiator unit 4, 5 is comprised of an upper tank 4a, 5a, a radiator section and a lower tank 4b, 5b. Furthermore, a reservoir tank 15 is arranged above the upper tank 4a of the radiator unit 4.

The above described radiator units 4, 5 are attached so as to be interposed between a tank rail 2 and a down tube 3, and are suitable for this type of frame shape. However, if the frame shape is altered in order to reduce weight or improve rigidity, it will sometimes not be possible for the radiator units 4 and 5 to be used as is. For example, if the shape of the radiator unit 4 is altered and the radiator units 4 and 5 are attached as is, the reservoir tank 14 and the radiator unit 5 interface with the frame or other components after alteration.

Manufacturing a new radiator in order to avoid interference with the frame and other components after alteration increases manufacturing cost.

SUMMARY OF THE INVENTION

It is therefore an object of the present invention to provide a motorcycle radiator structure intended to reduce the number of parts that will be newly manufactured and to reduce manufacturing cost.

In order to achieve the above described object, the present invention is directed to a radiator structure for a motorcycle, having radiators arranged at side sections of the motorcycle by providing a pair of left and right main frames extending rearwards from a head pipe. Vertical radiators include an upper tank, a core and a lower tank below a front part of the main frames, in which it is made possible for the radiator structure to be close to the main frames by providing upper indented sections in upper corners of the upper tank toward the center of the vehicle. Furthermore, it is made possible for the radiator structure to be close to an exhaust pipe by providing lower indented sections in outer lower corners of the lower tank.

Upper indented sections are provided in upper corners of the upper tanks of the radiator toward the center of the vehicle. The upper indented sections avoid the main frame, and interference between the main frame and the radiator is therefore prevented.

Lower indented sections are provided in the outer corners of the lower tanks of the radiator. The lower indented sections avoid an exhaust pipe, and interference between the mainframe and the exhaust pipe is therefore avoided.

As a result, there is no interference with the main frame or the exhaust pipe, even if an already existing core having a specified surface area is used.

The present invention includes the upper tank and the lower tank as press molded parts. The upper tank and the lower tank are the same molded part and can therefore be made with a single mold.

It will be possible to use a common tank by making the interference preventing shape of the upper tank and the interference preventing shape of the lower tank the same. Since a molded part made using a single mold is used as the upper tank and the lower tank, there is no need to prepare a plurality of molds.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 4(a), 4(b) and 4(c) are explanatory drawings of a tank manufacturing method to which the present invention relates.

DESCRIPTION OF THE PREFERRED EMBODIMENTS

Figure 1:
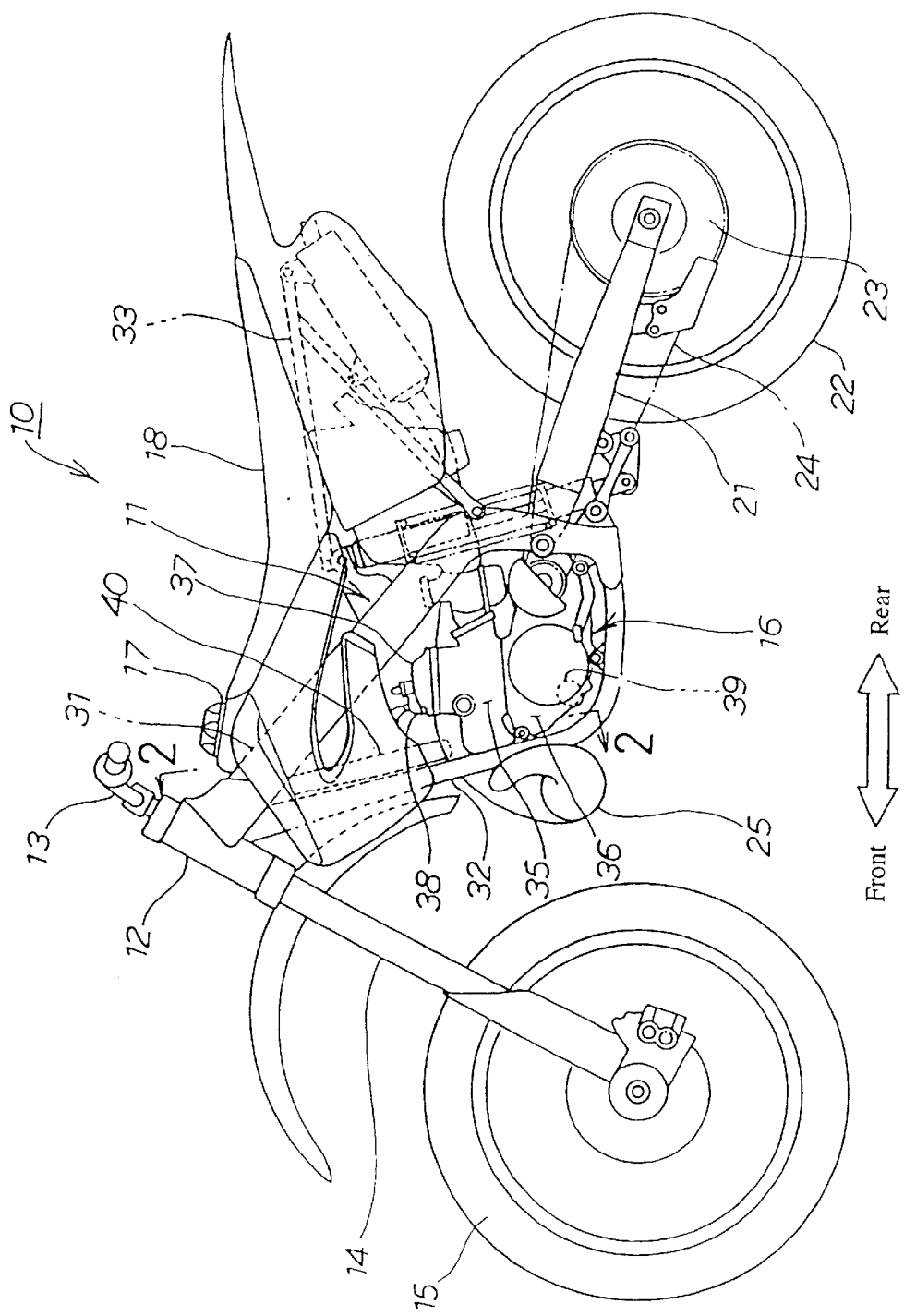
FIG. 1 is a left side elevation of a motorcycle to which the present invention relates.

Embodiments of the present invention will now be described with reference to the accompanying drawings. The drawings should be viewed in the direction of the orientation of the reference numerals, and the use of the terms "front," "rear," "left," and "right" are with reference to the rider.

FIG. 1 is a left side elevation of a motorcycle to which the present invention relates. The motorcycle 10 includes a vehicle frame 11, a handlebar 13 and front fork 14 attached to a head pipe 12 on the front end of the vehicle frame 11 so as to enable steering, a front wheel 15 attached to the front fork 14, an engine 16 arranged below a central section of the vehicle frame 11, a fuel tank 17 and a seat 18 arranged above the vehicle frame 11, a swingarm 21 extending downwards from a central lower part of the vehicle frame 11 so as to be capable of swinging up and down, a real wheel 22 attached to the rear of the swingarm 21, a rear sprocket 23 attached to the real wheel 22 and a chain 24 for transmitting drive force to the rear sprocket 23. Reference numeral 25 represents an exhaust pipe of the engine 16 and reference numeral 40 represents a radiator of the engine 16.

The vehicle frame 11 is made up of a head pipe 12, a pair of left and right main flames 31 extending rearwards from the head pipe 12, a single down tube 32 hanging down from the head pipe 12 and extending rearwards, and a pair of left and right seat rails 33 extending rearwards from a rear section of the main frame 31.

Forming the pair of left and right main frames 31 improves the rigidity of the vehicle frame 11.

The engine 16 is a two-cycle water cooled engine, and includes a cylinder block 35, a crankcase 36 attached below the cylinder block 35, a cylinder head 37 attached above the cylinder block 35 a thermostat cap 38 attached to the cylinder head 37, and a water pump 39 provided at a right lower section of the crankcase 36.

Figure 2:
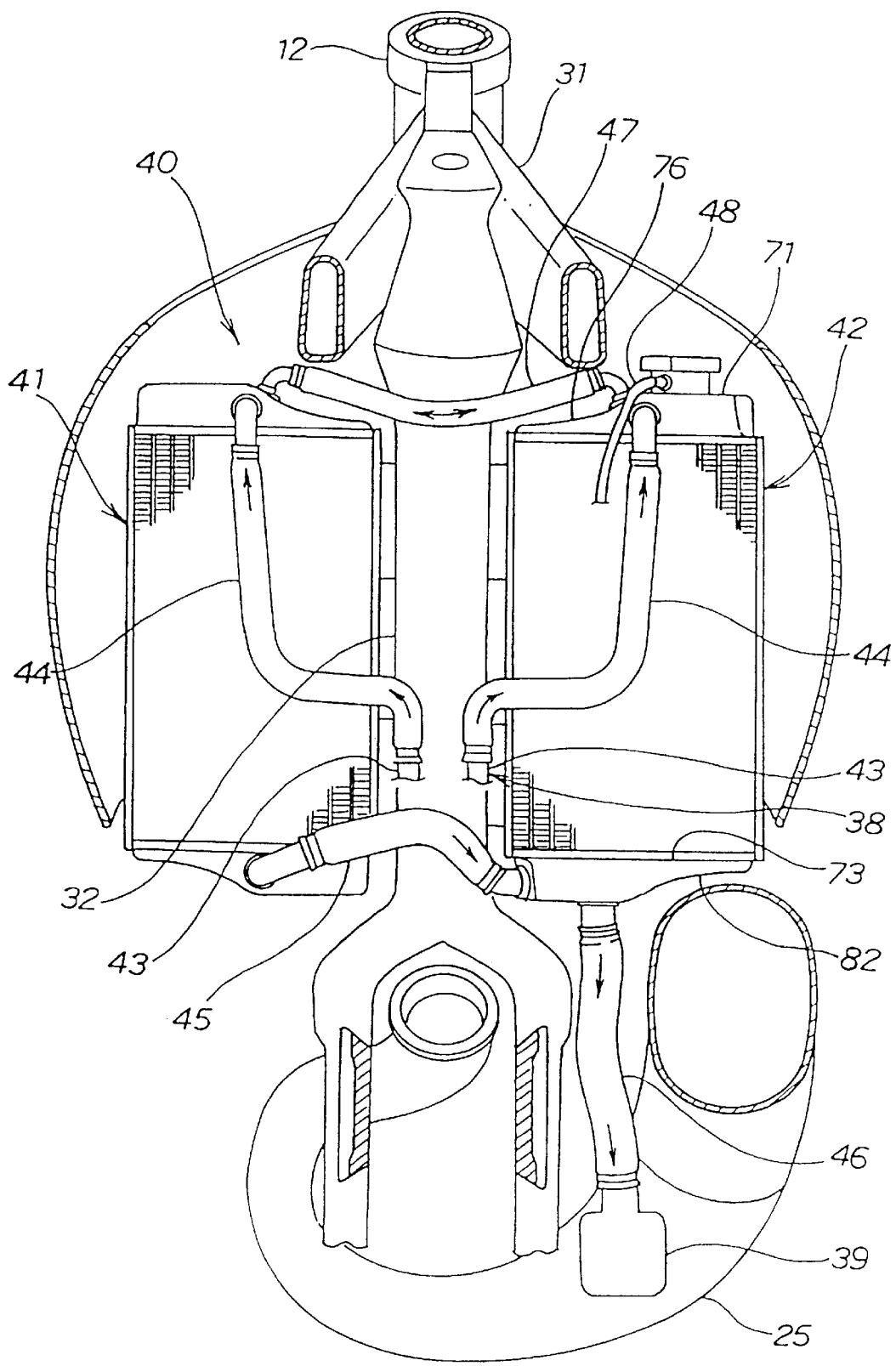
FIG. 2 is a cross sectional drawing along line 2—2 in FIG. 1.

FIG. 2 is a cross sectional drawing along line 2—2 in FIG. 1. The radiator 40 is a heat exchanging device comprising a left radiator 41 arranged on the left of the down tube 32 at the vehicle center, a right radiator 42 arranged on the right of the down tube 32, first radiator hoses 44, 44 allowing high temperature cooling water to circulate from cooling water outlets 43, 43 of the thermostat cap 38 to the left and right radiators 41 and 42, a second radiator hose 45 allowing low temperature cooling water to circulate from the bottom of the left radiator 41 to the right radiator 42, a third radiator hose 46 allowing low temperature cooling water to circulate from the bottom of the right radiator 42 to the water tank 39, a fourth radiator hose 47 between upper parts of the left and right radiators 41 and 42, and a siphon tube 48 provided in an upper part of the right radiator 42.

The route taken by the cooling water will now be described. When the cooling water reaches a specified temperature, a thermostat inside the thermostat cap 38 is opened and cooling water circulates from the cooling water outlets 43, to the first radiator hoses 44, 44, through the left radiator 41 and the right radiator 42, to the second radiator hose 45, to the third radiator hose 46, and finally to the water pump 39.

Figure 3:
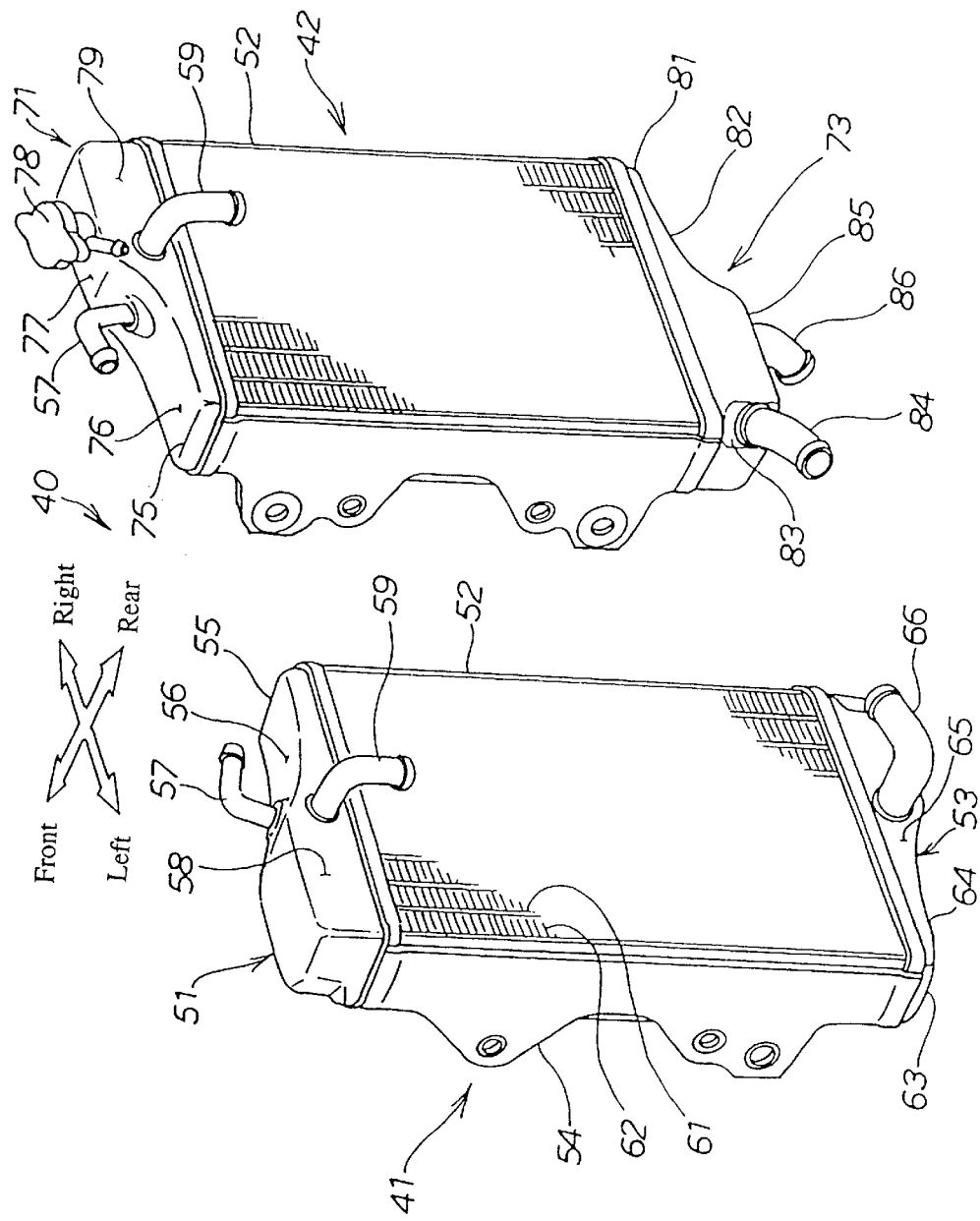
FIG. 3 is a perspective view of a radiator to which the present invention relates.

FIG. 3 is a perspective view of a radiator to which the present invention relates. FIG. 3 illustrated the left radiator 41 and the right radiator 42. The left radiator 41 has a vertical oblong shape and includes an upper tank 51 provided at an upper section, a core 52 provided in a middle section, a lower tank 53 provided at a lower section, and a bracket 54.

The upper tank 51 is provided with an upper indentation 56 in an upper corner 55 toward the center of the vehicle. Furthermore, the upper tank 51 has a communicating pipe joint 57 attached to the upper indentation 56 and an inlet pipe joint 59 attached to a rear surface 58. The upper tank 51 guides cooling water to the core 52.

The core 52 includes a plurality of water pipes 61 and a plurality of fins 62

The lower tank 53 is provided with a lower indentation 64 at an outer lower corner 63. Furthermore, the lower tank 53 has an outlet pipe joint 66 attached to a rear surface 65. The lower tank guides cooling water to the outlet.

The right radiator 42 has a vertical oblong shape and includes an upper tank 71 provided at an upper section a core 52 provided in a middle section, and a lower tank 73 provided at a lower section.

The upper tank 71 is provided with an upper indentation 76 in an upper corner 75 toward the center of the vehicle. Furthermore, the upper tank 71 has a communicating pipe joint 57 attached to the upper indentation 76. A cap 78 is attached to an upper section 77 and an inlet pipe joint 59 is attached to a rear surface 79. The upper tank 71 guides cooling water to the core 52.

The lower tank 73 is provided with a lower indentation 82 in an outer lower corner 81 Furthermore, the lower tank 73 has a lower pipe joint 84 attached to an angled section 83 and an outlet pipe joint 86 attached to a lower surface 85. The lower tank 73 guides cooling water to the outlet.

A method of manufacturing the above described upper and lower tanks 51 71 and 53, 73 will now be described. FIG. 4(*a*)–FIG. 4(*c*) are explanatory drawings of a tank manufacturing method to which the present invention relates.

(a) First of all, a mold 90, including a punch 91 and a die 92, is fitted into a press. A tank primary part 93 (hereinafter abbreviated to primary part 93) is formed as a common molded part using the mold 90.

The primary part 93 has an indented section 94, side surfaces 95, 96, 97 and 98, a bottom surface 99 and an opening 101.

(b) In order to make the upper tank 51, a communicating hole 102 is formed in the indented section 94 (corresponding to the upper indentation 56) of a primary part 93 shown in (a). The communicating pipe joint 57 is fitted into the communicating hole 102. Furthermore, an inlet hole 103 is formed in a side surface 96 (corresponding, to the rear surface 58) and the inlet pipe joint 59 is fitted into the inlet hole 103.

In order to make the lower tank 53, an outlet hole 104 is formed in a side surface 96 (corresponding to the rear surface 65) of a primary part 93, and the outlet pipe joint 66 is fitted into the outlet hole 104.

In this way, since the upper tank 51 and the lower tank 53 are formed as a common molded part (primary part 93) so that they can be made using a single mold 90, there is no need for a plurality of molding processes and it is possible to reduce the manufacturing cost of the molding.

(c) In order to make the upper tank 71, a communicating hole 105 is formed in the indented section 94 (corresponding to the upper indentation 76) of a primary part 93. The communicating pipe joint 57 is fitted into the communicating hole 105, an inlet hole 106 is formed in a side surface 96 (corresponding to the rear surface 79), the inlet pipe joint 59 is fitted into the inlet hole 106, a cap hole 107 is formed in the bottom section 99 (corresponding to the upper section 77), and the cap 78 is fitted into the cap hole 107.

Finally, to make the lower tank 73, a communicating hole 108 is formed in a side surface 97 (corresponding to the angled section 93) of the primary part 93, the lower pipe joint 84 is fitted into the communicating hole 108, an outlet hole 109 is formed in a bottom surface 90 (corresponding to the lower surface 85), and the outlet pipe joint 86 is fitted into the outlet hole 106.

In this way, since the upper tank 71 and the lower tank 73 are formed as a common molded part (primary part 93) so that they can be made using a single mold 90, there is no need for a plurality of molding processes and it is possible to reduce the manufacturing cost of the molding.

In other words, since the indentation of the tank primary part 93 formed by the single mold 90 is of such a shape that it can be used for the upper tanks 51 and 71 and the lower tanks 53 and 73, it is possible to use the same part for all tank parts and it is possible to reduce the manufacturing cost of the radiator.

Furthermore, since the set up such as mold attachment and mold removal can be completed in one step, the production efficiency of press moldings is improved.

The operation of the motorcycle radiator structure described above will now be described.

FIGS. 5(*a*) and FIG. 5(*b*) are operational drawings for the radiator of the present invention. FIG. 5(*a*) is a left side elevation of the right radiator while FIG. 5(*b*) is a cross sectional view alone line b—b in FIG. 5(*a*).

Figure 5B:
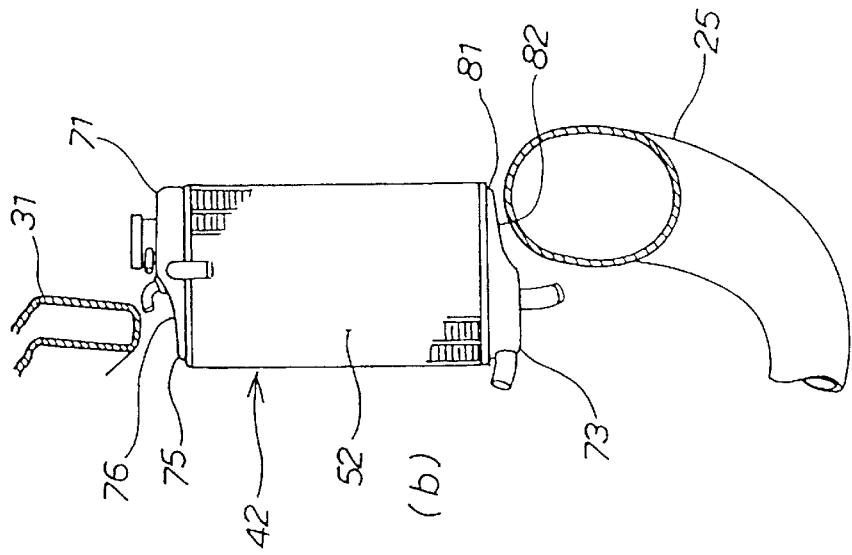
FIGS. 5(a) and 5(b) are operational drawings of a radiator to which the present invention relates.
Figure 5A:
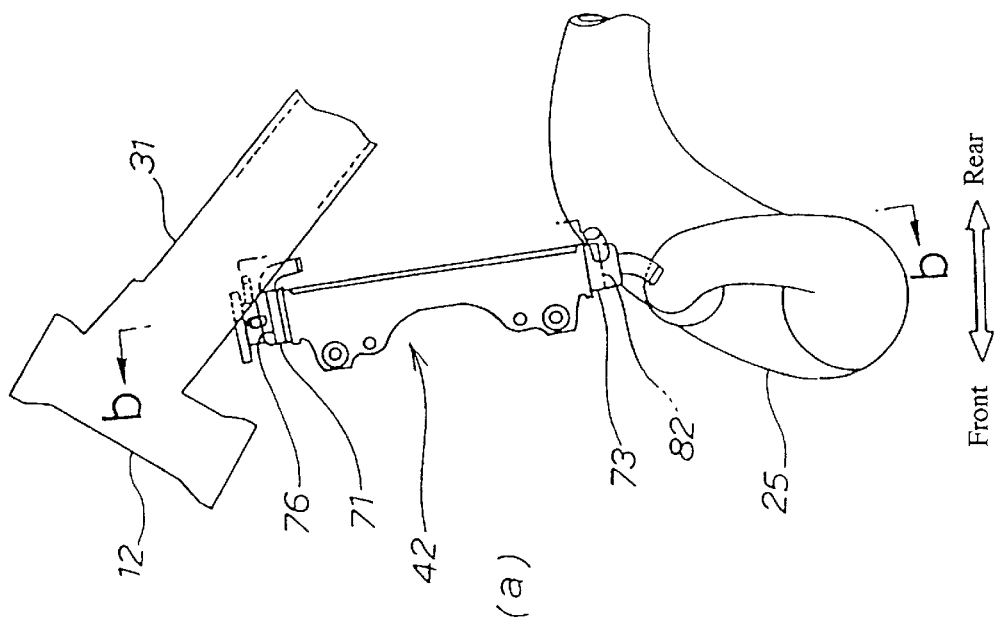

In FIG. 5(a), by providing an upper indentation 76 in the upper tank 71 of the vertical oblong right radiator 42. it is possible to arrange the right radiator 42 without interfering, with the mainframe 31, even if the pair of left and right mail) frames 31 extend downwards from the head pipe 12.

Furthermore, by providing the lower indentation 82 in the lower tank 73 of the vertical oblong right radiator 42 it is possible to arrange the right radiator 45 without interfering with the exhaust pipe 25 of the 2-cycle engine.

In FIG. 5(b), by providing the upper indentation 76 in the upper corner 75 of the upper tank 71 of the right radiator 42 towards the center of the vehicle it is possible to provide the upper tank 71 on an existing core 52 without interfering with the main frame 31.

Furthermore, by providing the lower indentation 82 in an outer lower corner of the upper tank 73 of the right radiator 42, it is possible to provide the lower tank 73 on an existing core 52 without interfering, with the exhaust pipe 25.

As a result, it is possible to ensure a large surface area of the core 52 and to maintain heat radiation characteristics of the right radiator 42.

The same also applies to the left radiator 41 shown in FIG. 3, namely, by providing the upper indentation 56 in the upper corner 55 toward the vehicle center it is possible to similarly enlarge the surface area of the core 52, the heat radiation characteristics of the left radiator 41 are maintained and it is possible to arrange the left radiator 41 without interfering with the main frame 31.

The radiator 40 of FIG. 2 representing an embodiment of the present invention comprises a left radiator 41 and a right radiator 42, but it is also possible to have an arrangement with only the right radiator 42.

The present invention achieves the following effects.

According to a first aspect of the present invention, a pair of left and right main frames extend rearwards from a head pipe and a vertical oblong radiator is provided below a front part of the main frames. By providing an upper indentation in an upper corner of an upper tank of the radiator towards the center of the vehicle, the upper indentation avoids the mainframes and the radiator does not interfere with the main frame.

Since a lower indentation is provided in an outer lower corner of the lower tank of the radiator, the lower indentation avoids the exhaust pipe and the radiator does not interfere with the exhaust pipe.

Also, since the upper indentation is provided in an upper corner of the upper tank of the radiator towards the center of the vehicle, and the lower indentation is provided in an outer lower corner of the lower tank, it is possible to make the core surface area (heat radiation characteristics) large, and it is possible to take advantage of an already existing core. As a result, it is possible to reduce the manufacturing cost of the radiator.

According to a second aspect of the present invention, the upper and lower tanks are made from the same molded component. Since the indentation has a shape that makes it possible to prevent interference at a number of places, it is possible to use a tank primary molded part formed using, a single mold as the upper tank and lower tank of the left radiator, and the upper tank and lower tank of the right radiator upper tank. As a result, there is no need for a plurality of molding processes, it is possible to reduce the manufacturing cost of welding and it is possible to reduce the manufacturing cost of the radiator.

The invention being thus described, it will be obvious that the same may be varied in many ways. Such variations are not to be regarded as a departure from the spirit and scope of the invention, and all such modifications as would be obvious to one skilled in the all are intended to be included within the scope of the following claims.

What is claimed is:

1. A radiator structure for a motorcycle, the motorcycle having a pair of left and right main frames extending rearwards from a head pipe, vertical radiators arranged at side sections of the motorcycle, the radiators each including an upper tank, a core, and a lower tank located below a front part of the main frames, said radiator structure comprising:
   an upper indented section in an upper corner of at least one of the upper tanks located toward a center of the motorcycle; and
   a lower indented section in an outer lower corner of at least one of the lower tanks,
   wherein the upper intended section makes it possible for the radiator structure to be close to the main frames and the lower indented section makes it possible for the radiator structure to be close to an exhaust pipe of the motorcycle.

2. The radiator structure for a motorcycle according to claim 1, wherein the upper tank and the lower tank are press molded parts, and the upper tank and the lower tank are the same molded part so that they can be made with a single mold.

3. The radiator structure for a motorcycle according to claim 1, wherein each of the upper tanks include said upper indented section and each of the lower tanks include said lower indented section.

4. The radiator structure for a motorcycle according to claim 1, wherein a communicating pipe joint is located in said upper indented section of each of said upper tanks.

5. The radiator structure for a motorcycle according, to claim 4, wherein one of said upper tanks includes a cap attached to an upper section thereof and an inlet pipe joint attached to a rear surface thereof.

6. The radiator structure for a motorcycle according to claim 5, wherein the other of said upper tanks includes an inlet pipe joint attached to a rear surface thereof, and said upper tanks guide cooling water to the core of the radiator.

7. The radiator structure for a motorcycle according to claim 1, wherein one of said lower tanks includes an outlet pipe joint attached to a rear surface thereof, and the other of said lower tanks includes a lower pipe joint attached to an angled section thereof and an outlet pipe joint attached to a lower surface thereof, and said lower tanks guide cooling water to said outlet pipe joint.

8. A motorcycle, comprising:
   a pair of left and right main frames extending rearwards from a head pipe of the motorcycle;
   vertical radiators arranged at side sections of the motorcycle, said radiators each including an upper tank, a core, and a lower tank located below a front part of the main frames,
   an upper indented section in an upper corner of at least one of the upper tanks located toward a center of the motorcycle; and
   a lower indented section in an outer lower corner of at least one of the lower tanks,
   wherein the upper indented section makes it possible for the radiator structure to be close to the main frames and the lower indented section makes it possible for the radiator structure to be close to an exhaust pipe of the motorcycle.

9. The motorcycle according to claim 8, wherein the upper tank and the lower tank are press molded parts, and the upper tank and the lower tank are the same molded part so that they can be made with a single mold.

10. The motorcycle according to claim 8, wherein each of the upper tanks include said upper indented section and each of the lower tanks include said lower indented section.

11. The motorcycle according to claim 8, wherein a communicating pipe joint is located in said upper indented section of each of said upper tanks.

12. The motorcycle according to claim 11, wherein one of said upper tanks includes a cap attached to an upper section thereof and an inlet pipe joint attached to a rear surface thereof.

13. The motorcycle according to claim 12, wherein the other of said upper tanks includes an inlet pipe joint attached to a real surface thereof, and said upper tanks guide cooling water to the core of the radiator.

14. The motorcycle according to claim 8, wherein one of said lower tanks includes an outlet pipe joint attached to a rear surface thereof, and the other of said lower tanks includes a lower pipe joint attached to an angled section thereof and an outlet pipe joint attached to a lower surface thereof, and said lower tanks guide cooling water to said outlet pipe joint.

* * * * *